United States Patent [19]

Kato et al.

[11] Patent Number: 4,881,018

[45] Date of Patent: Nov. 14, 1989

[54] MANUALLY ASSISTABLE ELECTRIC DRIVING DEVICE

[75] Inventors: Yoji Kato, Konan; Osamu Minai, Kariya; Hirosi Tukamoto, Okazaki; Takashi Hagiwara, Chiryu; Katsuji Kosaka, Anjo, all of Japan

[73] Assignee: Nippondenso Co., Ltd., Kariya, Japan

[21] Appl. No.: 282,050

[22] Filed: Dec. 9, 1988

[30] Foreign Application Priority Data

Dec. 18, 1987 [JP] Japan .................................. 62-322065

[51] Int. Cl.⁴ .................... F16D 23/00; H02K 7/10
[52] U.S. Cl. .................................. 318/9; 318/280; 318/430; 49/139; 49/349; 192/0.02 R; 192/21
[58] Field of Search ................. 49/40, 139, 348, 349; 318/9, 280, 430; 192/0.02 R, 0.03, 0.032, 0.033, 0.034, 0.07, 8 R, 20, 21, 32, 40, 43, 47, 142 R; 292/DIG. 3, DIG. 4, DIG. 5, DIG. 6

[56] References Cited

U.S. PATENT DOCUMENTS

| 3,050,166 | 8/1962 | Cunningham | 192/43 |
| 3,243,023 | 3/1966 | Boyden | 192/8 R |
| 3,279,571 | 10/1966 | Wassilieff | 192/47 X |
| 3,757,472 | 9/1973 | Rogakos . | |
| 3,907,083 | 9/1975 | Nieder | 192/43 X |
| 4,485,901 | 12/1984 | Papadopoulos | 192/8 R |
| 4,697,676 | 10/1987 | Haake | 192/8 R |
| 4,762,332 | 8/1988 | Seol | 192/47 |

FOREIGN PATENT DOCUMENTS 22-359588 7/1947 Japan .
61-207772 9/1986 Japan .

Primary Examiner—Bentsu Ro
Attorney, Agent, or Firm—Cushman, Darby & Cushman

[57] ABSTRACT

A manually assistable electric driving device for a lid of an automobile luggage compartment has a clutch mechanism disposed between an electric motor and an output member drivingly connected to the lid. The clutch mechanism is so constructed that, when the lid is being driven by the motor in either direction, the lid can be manually moved in the same direction and at a speed higher than the speed caused by the motor drive.

6 Claims, 19 Drawing Sheets

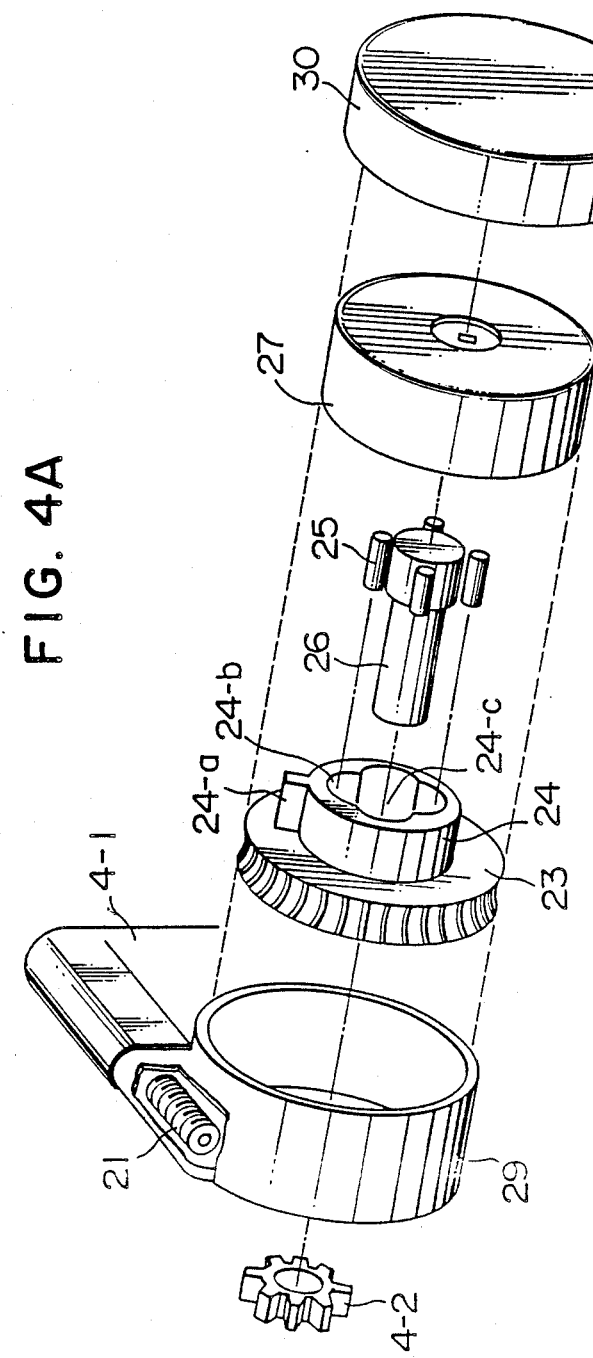
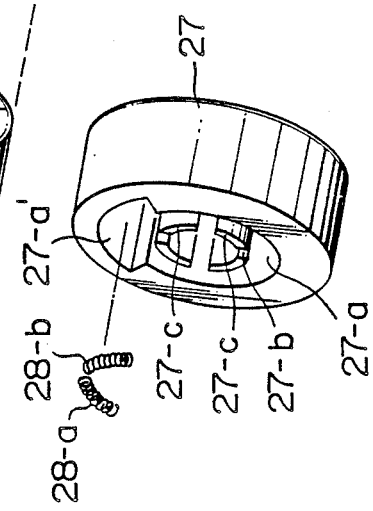
FIG. 4A
FIG. 4B

FIG. 14

(a) CLOSING SW (b) FF302Q (c) FF301Q (d) TIMER 321Q
(e) TIMER 322Q
(f) OVERLOAD DETECTION
(g) FF314D
(h) $\overline{\text{JAMMING SENSOR}}$ (i) FULL OPEN SW
(j) FF302CLR
(k) FF301CLR (ℓ) LID MOTOR (OPENING)
(m) LID MOTOR (CLOSING)

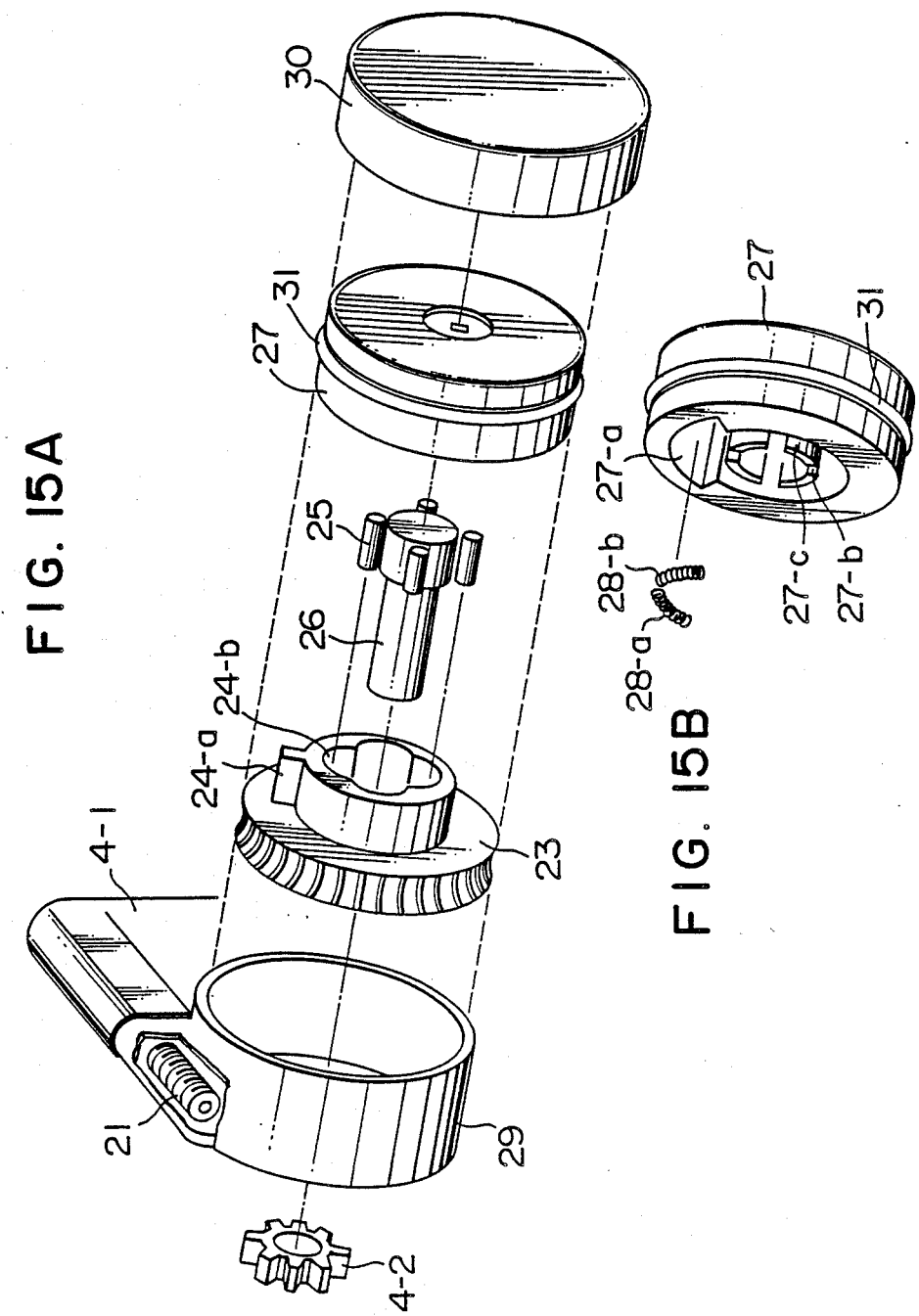

4,881,018

MANUALLY ASSISTABLE ELECTRIC DRIVING DEVICE

FIELD OF THE INVENTION

The present invention relates to a device for electrically driving a driven member, such as door, which can be manually assisted to increase the speed of the movement of the driven member.

DESCRIPTION OF THE PRIOR ART

Drives which make use of electric motors have been used in various fields. In the case where the drive is of a high speed, the drive is quickly responsive but would suffer from a problem that an operator's hand is caught in a driven member. On the other hand, in the case where the drive is of a low speed, the drive suffers from a poor response. Thus, it is desirable to manually increase the speed of the movement of a member which is being driven by an electric motor. When the operation of the motor is stopped due to a trouble, the driven member must be manually operated. In such a case, an unduly great manual force would be needed if the drive is structured such that the manual operation of the driven member inevitably causes the motor to be rotated.

SUMMARY OF THE INVENTION

It is a object of the present invention to make it possible to manually accelerate the movement of a driven member when it is driven by an electric motor as well as to manually easily operate the driven member without rotating the motor when the same is stopped.

It is another object of the present invention to improve the safety and operability of automotive doors.

It is a further object of the present invention to make it possible to stop a motor and manually operate a driven member when an operator's hand is caught by the driven member whereby the operator's hand can be disengaged from the driven member.

It is a still further object of the present invention to provide a clutch mechanism which allows a driven member to be manually driven more easily than in the case where an electric motor is drivingly connected to a driven member by a slip clutch (which is also called by "torque limiter") and which, when the motor is driven, can reliably transmit a greater force to the driven member than the slip clutch can do.

The manually assistable electric driving device according to the present invention is of the type in which a driven member can be electrically driven in forward and backward directions and the movement of the driven member being driven electrically can be manually assisted to increase the speed of the movement. The device comprises a reversible electric motor and a first rotor adapted to be driven by the electric motor and having an axial through-hole. The first rotor has at least one arcuate recess formed in the inner peripheral surface of the axial through-hole and having slopes at the opposite ends of the recess. A second rotor has a cylindrical outer peripheral surface and is rotatably disposed in the axial through-hole in the first rotor. A bearing means is disposed in the arcuate recess in the first rotor and adapted to be brought into engagement with the slopes of the arcuate recess and with the outer peripheral surface of the second rotor. A bearing retainer supports the bearing means such that the bearing means is movable radially of the second rotor and is not freely movable circumferentially of the first rotor. A resilient means is provided to store an elastic energy when the first rotor is rotated by the electric motor relative to the second rotor so that one of the slopes of the first rotor is drivingly coupled by the bearing means to the outer peripheral surface of the second rotor. The thus stored elastic energy is effective to drive the bearing means to a substantially central portion of the arcuate recess when the electric motor is stopped whereby the second rotor is freely rotatable independently of the first rotor. The driven member is drivingly connected to the second rotor.

In a preferred embodiment of the invention, the driven member is a door such as a lid of a luggage compartment of an automobile. The luggage compartment lid can be manually moved quickly toward an open position independently of the lid-opening operation of the motor.

The above objects, features and advantages of the present invention will be made more apparent by the following description with reference to the accompanying drawings.

BRIEF DESCRIPTION OF THE DRAWINGS

FIG. 4A is an enlarged exploded perspective view of a clutch mechanism;

FIG. 4B is an exploded perspective view of an inertia disc and coil springs of the clutch mechanism;

FIGS. 5A to 5D illustrate the operation of the clutch mechanism, wherein FIG. 5A is an axial section of the clutch mechanism, FIG. 5B is a sectional view taken along line VB—VB in FIG. 5A and FIGS. 5C and 5D are similar to FIG. 5B but illustrate the component parts of the clutch mechanism in different positions;

FIGS. 10-14 are time charts of the operation of the embodiment of the invention;

FIGS. 15A and 15B are respectively similar to FIGS. 4A and 4B but illustrate a modification to the embodiment shown therein.

DESCRIPTION OF PREFERRED EMBODIMENTS

The embodiment described hereinunder is applied to an actuator of a lid of a luggage compartment of an automobile.

Figure 1:
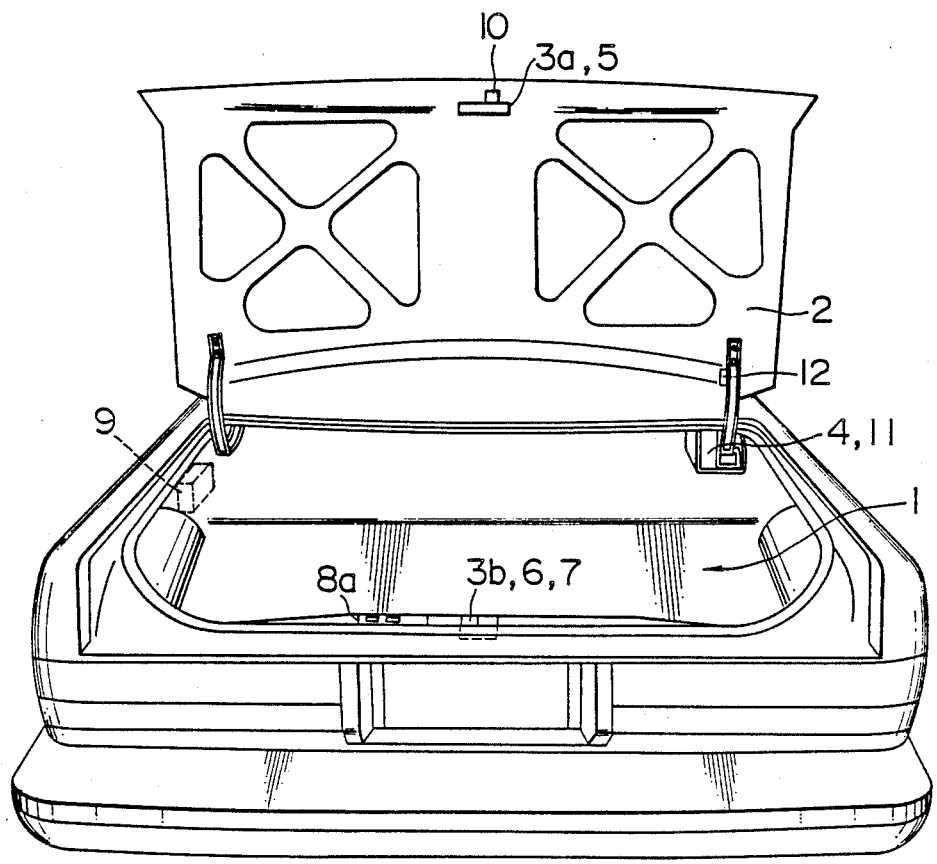
FIG. 1 is a rear view of an automobile equipped with an embodiment of the device of the present invention.
Figure 2:
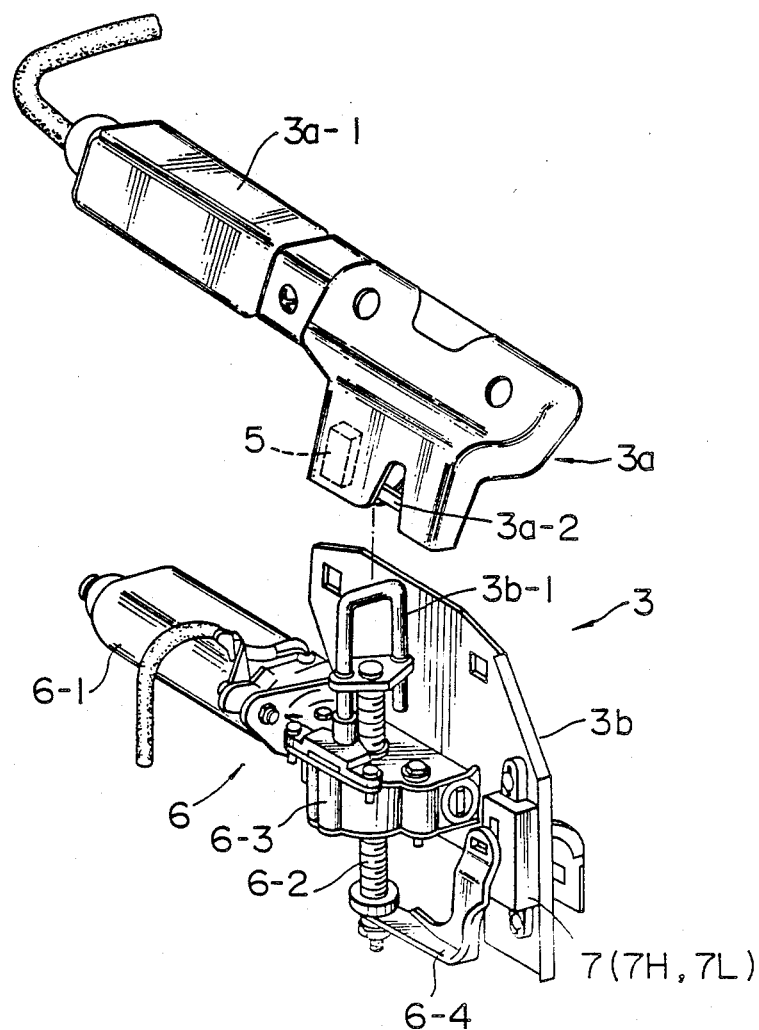
FIG. 2 is an exploded perspective view of a lid-locking mechanism and other elements associated therewith.

FIG. 1 illustrates a lid 2 of a luggage compartment 1 when the lid is in its open position. A lid-locking mechanism 3 shown in FIG. 2 is formed by first and second sections 3a and 3b which are respectively mounted on the lid 2 and body of the automobile and engageable with each other when the lid 2 is moved almost to its fully closed position. A first driving means 4 is mounted on the body of the automobile and adapted to actuate the lid 2 in lid-opening and lid-closing directions. A first detecting means is formed by a lock plate switch 5 which is incorporated in the first section 3a of the lid-locking mechanism 3 and adapted to detect the lid-locking mechanism 3 when the latter is in its locked position. A second driving means 6, which is shown in detail in FIG. 2, is united with the second section 3b of the lid-locking mechanism 3 and is adapted to move the lid 2 to its fully closed position after the two sections 3a and 3b of the lid-locking mechanism 3 have been engaged with each other. A second detecting means is formed by a striker switch 7 secured to the second section 3b of the lid-locking mechanism 3 and adapted not only to detect the lid 2 when it is moved to its fully closed position but also to detect the lid 2 when it is opened to the upper limit position of the lid-locking mechanism 3. A command switch 8a for the closing of the lid 2 and a controller 9 for the first and second driving means will be described in detail later. A key switch 10 detects the lid 2 when it is unlocked by a key. A full-open switch 11 detects the lid 2 when it is fully opened. A jamming sensor 12 detects the occurrence of a jamming to be described later.

The lid-locking mechanism 3, the lock plate switch 5 forming the first detecting means, the second driving means 6 and the striker switch 7 forming the second detecting means are shown in FIG. 2 in exploded positions.

The first section 3a of the lid-locking mechanism 3 is mounted on the lid 2 and includes an unlocking solenoid 3a-1 for unlocking the locking mechanism 3, and a lock plate 3a-2. The lock plate switch 5 in the first section 3a of the lid-locking mechanism 3 detects the lock plate 3a-2 when it is in its locked position shown in FIG. 2.

The second section 3b of the lid-locking mechanism 3 is mounted on the rear wall of the luggage compartment 1 and includes a striker 3b-1 engageable with the lock plate 3a-2. The second driving means 6 includes a luggage motor 6-1, a splined shaft 6-2 and a gear section 6-3 driven by the motor 6-1 to upwardly and downwardly actuate the splined shaft 6-2. The lower end of the splined shaft 6-2 is connected with an arm 6-4 which is adapted to operate the striker switch 7. The latter includes upper and lower limit switches 7H and 7L which respectively detect via the arm 6-4 the splined shaft 6-2 when it is moved to its upper and lower limit positions.

Figure 3:
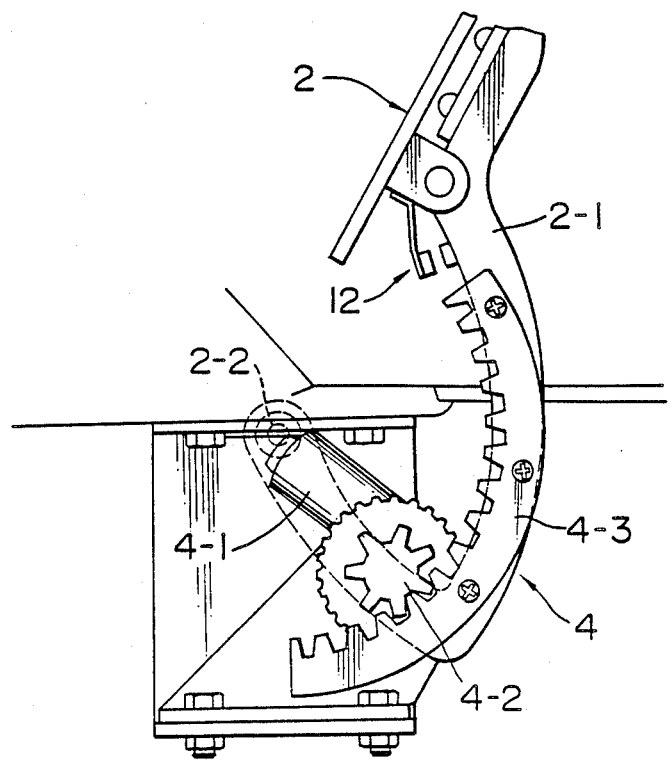
FIG. 3 is a side elevation of a first driving means.

The first driving means 4 is shown in detail in FIG. 3. The lid 2 is pivotally supported through an arm 2-1 by a pivot 2-2 secured to the inner surface of the top wall of the luggage compartment and is resiliently biased toward its open position by a tensioner which is not shown. The first driving means 4 includes a driving motor 4-1, a pinion 4-2 driven by the motor 4-1 and a rack 4-3 secured to the arm 2-1 and having gear teeth disposed in meshing engagement with the gear teeth of the pinion 4-2.

The first driving means 4 further includes a clutch mechanism which is shown in detail in FIGS. 4A and 4B. As will be seen in these figures, the clutch mechanism includes a worm 21 driven by the driving motor 4-1 and a worm wheel 23 which is engaged with the worm 21 and integral with a housing 24 which cooperates with the worm wheel 23 to form a first rotor. The housing 24 has an integral projection 24-a formed on the outer peripheral surface of the housing and is provided with an axial through-hole 24-c of a cross-section similar to a four-leaved clover defined by four arcuate recesses 24-b formed in the inner peripheral surface of the through-hole 24-c. The through-hole 24-c rotatably accommodates an inner shaft 26 which forms a second rotor on which rollers 25 of a roller bearing are disposed and accommodated in the arcuate recesses 24-b, respectively. An inertia disc 27 forms a third rotor and has an end face in which a central hole 27-a is formed. The hole 27-a is radially outwardly expanded at a portion by an arcuate recess 27-a' which accommodates a pair of coil springs 28-a and 28-b. A four axial projections 27-c, each of an arcuate cross-section, are formed on the bottom wall of the hole 27-a and disposed coaxially with the hole 27-a. The projections 27-c are circumferentially spaced with each other by gaps 27-b which accommodate the rollers 25, respectively. In other words, the four axial projections 27-c form a bearing retainer. The elements described above are housed in a first and second casings 29 and 30 in the manner to be described hereunder.

Referring to FIGS. 5A–5D, each of the recesses 24-b formed in the inner peripheral surface of the through-hole 24-c in the first rotor formed by the housing 24 driven by the motor is of a substantially crescent shape having slopes 24-b1 and 24-b2 at the opposite sides of the recess 24-b. The inner shaft 26 forming the second rotor is of a metal and has a generally cylindrical outer peripheral surface. The arcuate recess 27-a formed in the inertia disc 27 which forms the third rotor accommodates the projection 24-a and the two springs 28-a and 28-b positioned on the opposite sides of the projection 24-a. The body of the inner shaft 26 extends through the through-hole 24-c in the housing 24 and the worm wheel 23, as will be seen in FIG. 5A. The two springs 28-a and 28-b on the opposite sides of the projection 24-a are operative to resiliently bias the projection 24-a toward the center of the circumferential length of the arcuate recess 27-a, so that the housing 24 and the worm wheel 23 are circumferentially biased to a position in which each of the rollers 25 of the roller bearing is positioned centrally of an associated crescent-shaped recess 24-b.

Figure 5A:
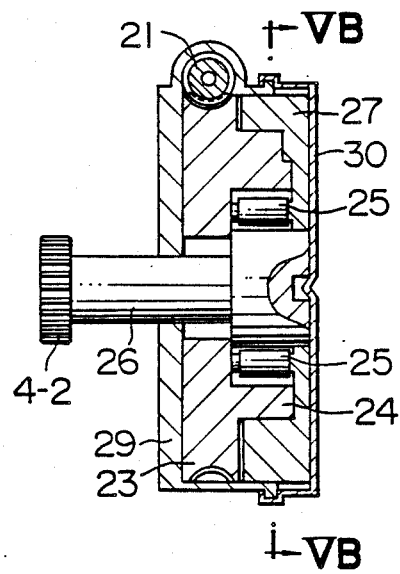
Figure 5B:
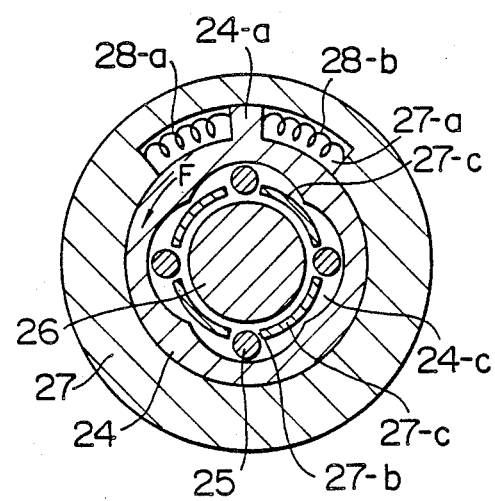

To operation of the clutch mechanism will be described hereunder with reference to FIGS. 5A through 5D. When the motor 4-1 shown in FIG. 4A is not in operation, the projection 24-a on the housing 24 is positioned at the center of the arcuate recess 27-a by the operations of the springs 28-a and 28-b, as shown in FIG. 5B. The four rollers 25 are freely positioned respectively in the gaps 27-b defined between the respective adjacent pairs of the axial projections 27-c formed on the inertia disc 27, as will be also seen in FIG. 5B. In this position of the clutch mechanism, the inner shaft 26 is not drivingly connected to the housing 24, so that the rotation of the shaft 26 merely results in free rotations of the rollers 25 about their axes. Accordingly, the lid 2 of the luggage compartment 1 can be manually operated.

Figure 5C:
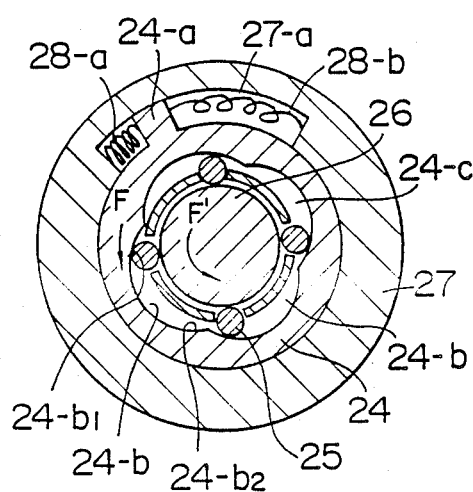

When an operation switch is actuated to rotate the motor 4-1 in, for example, a lid-closing direction, the worm 21 rotates the worm wheel 23. In consequence, the housing 24 integral with the worm wheel 23 begins to rotate in a direction indicated by an arrow shown in FIG. 5B and with a force F. At this time, however, the inertia disc 27 outward of the housing 24 is not immediately rotated because the inertia disc is heavier and presents an inertia of rest position relative to the force F. However, when the rotation of the housing 24 brings the sloped ends 24-b1 of the arcuate recesses 24-b in the housing 24 into contact with the rollers 25, respectively, the rollers are pushed radially inwardly into engagement with the outer peripheral surface of the inner shaft 26, as shown in FIG. 5C, so that the rollers 25 are locked with the housing 24 and the inner shaft 26, with a result that the torque of the motor is transmitted through the worm 21, the worm wheel 23, the housing 24, the rollers 25 and the inner shaft 26 to the lid-driving pinion 4-2 rigidly mounted on the shaft 26 at its one end, as shown in FIG. 5A.

If the lid 2, which is being electrically driven in its closing direction as described above, is manually forced in the same direction but at a speed higher than that given by the motor drive, the inner shaft 26 receives via the lid-driving pinion 4-2 a manual force F' which is stronger and quicker than the force F applied by the motor and which acts in the direction the same as the direction of the force F. The inner shaft 26, therefore, is rotated by the stronger and quicker manual force F' to move the rollers 25 out of locking engagement with the sloped ends 24-b1 of the recesses 24-b, so that the inner shaft 26 and thus the pinion 4-2 are freely rotatable relative to the motor to allow the lid 2 to be quickly closed by the manual assisting force F'.

Figure 5D:
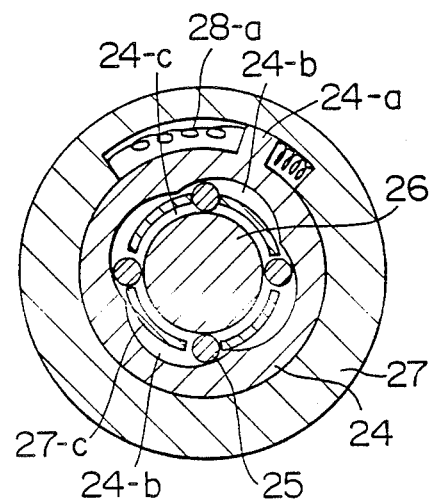

When it is desired to open the lid 2 by the electric force, the motor is operated in the reversed direction. In this case, the rollers 25 are brought into locking engagement with the sloped ends 24-b2 of the recesses 24-b and with the inner shaft 26, as shown in FIG. 5D. The motor drive to open the lid 2 can also be manually assisted for a similar reason.

It is to be noted that, when the lid 2 is being closed by the force of the motor, the door cannot be manually opened and that, when the lid 2 is being opened by the motor drive, the lid cannot be manually closed. Such a manual force will merely result in forcing the rollers 25 more strongly against the inner shaft 26 with a resultant increase in the torque-transmission capability of the clutch mechanism.

Figure 6A:
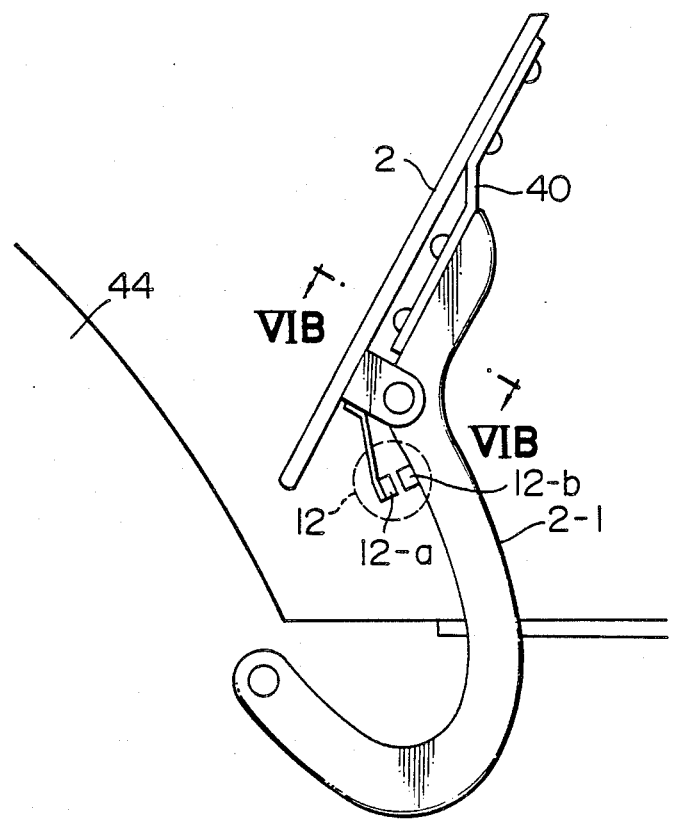
FIG. 6A is a side elevation of a jamming sensor.
Figure 6B:
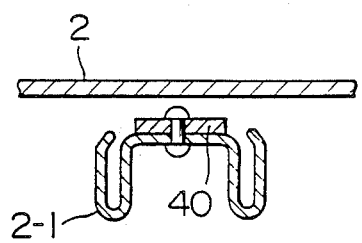
FIG. 6B is a section taken along ling VIB—VIB in FIG. 6A.

FIGS. 6A and 6B show a mechanism for detecting an obstacle jammed between the luggage-compartment lid 2 and the body 44 of the automobile. The pivotal arm 2-1 is connected to an end of a flexible member 40 which in turn is connected at the other end to the lid 2. A jamming sensor 12 is formed by a pair of contacts 12-a and 12-b mounted respectively on the lid 2 and the arm 2-1. In the illustrated embodiment of the invention, the flexible member 40 is formed of a leaf spring having a suitably selected spring force. The contacts of the sensor 12 are normally open. When an obstacle such as a part of a human body is caught by the luggage-compartment lid 2 when the lid 2 is being closed by the motor drive, the flexible member 40 is flexed to close the contacts 12-a and 12-b, with a result that the motor is immediately deenergized to interrupt the closing motion of the lid 2 and the latter is moved toward its open position, as will be described later.

Figure 7:
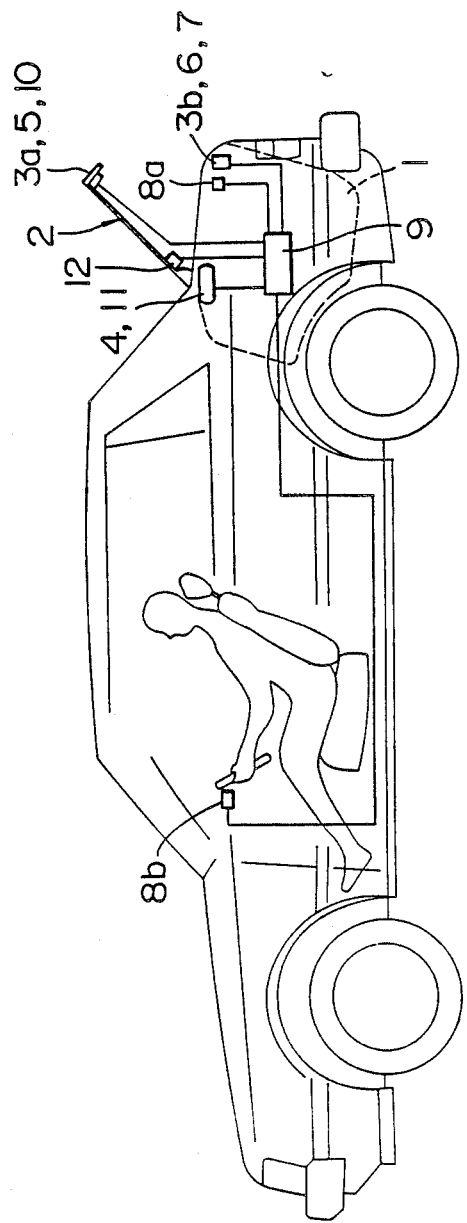
FIG. 7 is a side elevation of an automobile showing an arrangement of the embodiment of the invention on the automobile.

FIG. 7 illustrates an arrangement of respective components of the embodiment of the device of the invention. A controlling unit 9 is disposed in the luggage compartment 1 and associated with the aforementioned switches and driving means as well as with a command switch 8b for controlling the opening and closing of the lid 2, the switch 8b being disposed in a passenger compartment adjacent to a driver's seat.

Figure 8:
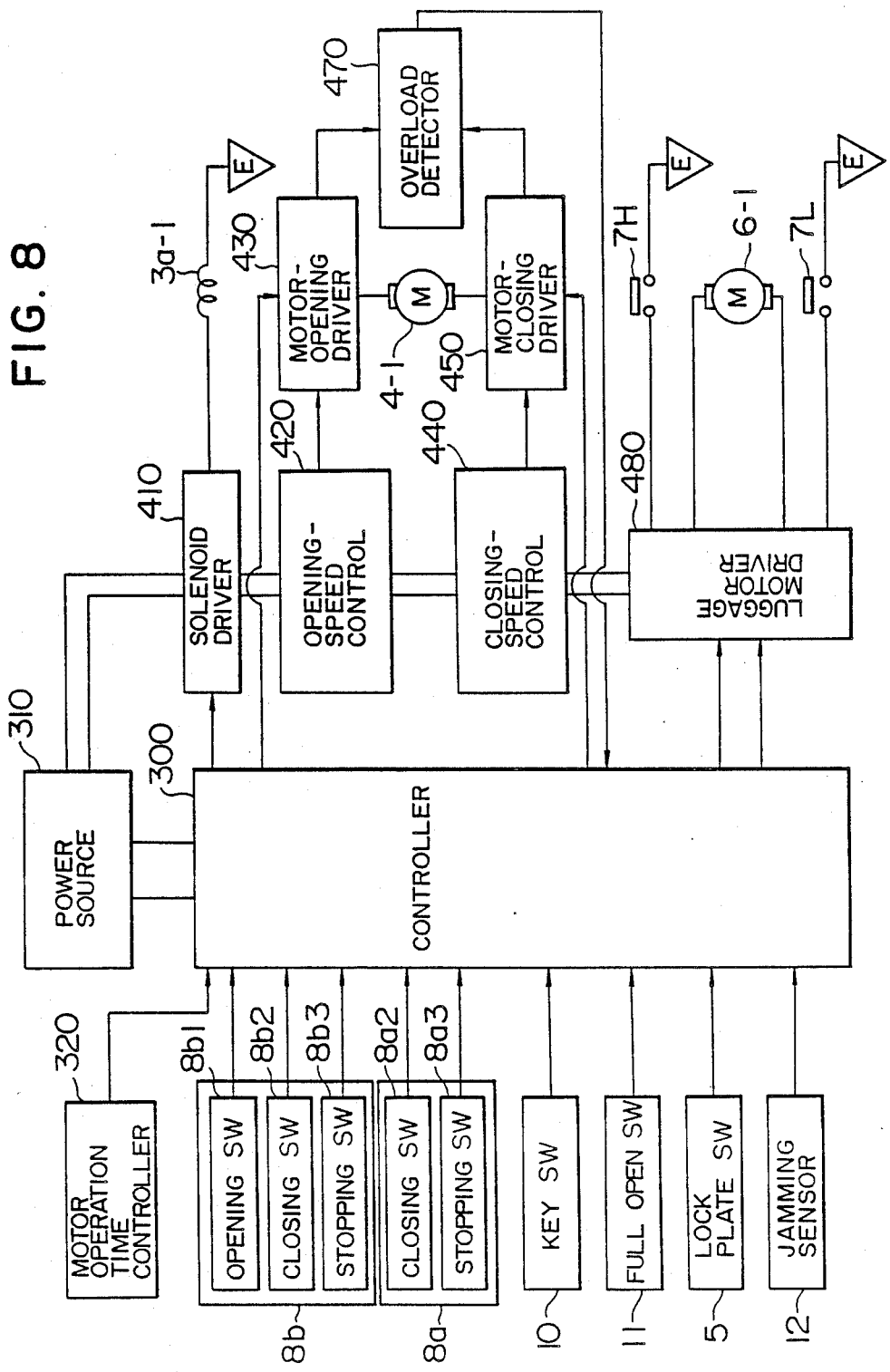
FIG. 8 is a brief block diagram of an electric arrangement incorporated in the embodiment of the invention.
Figure 9A:
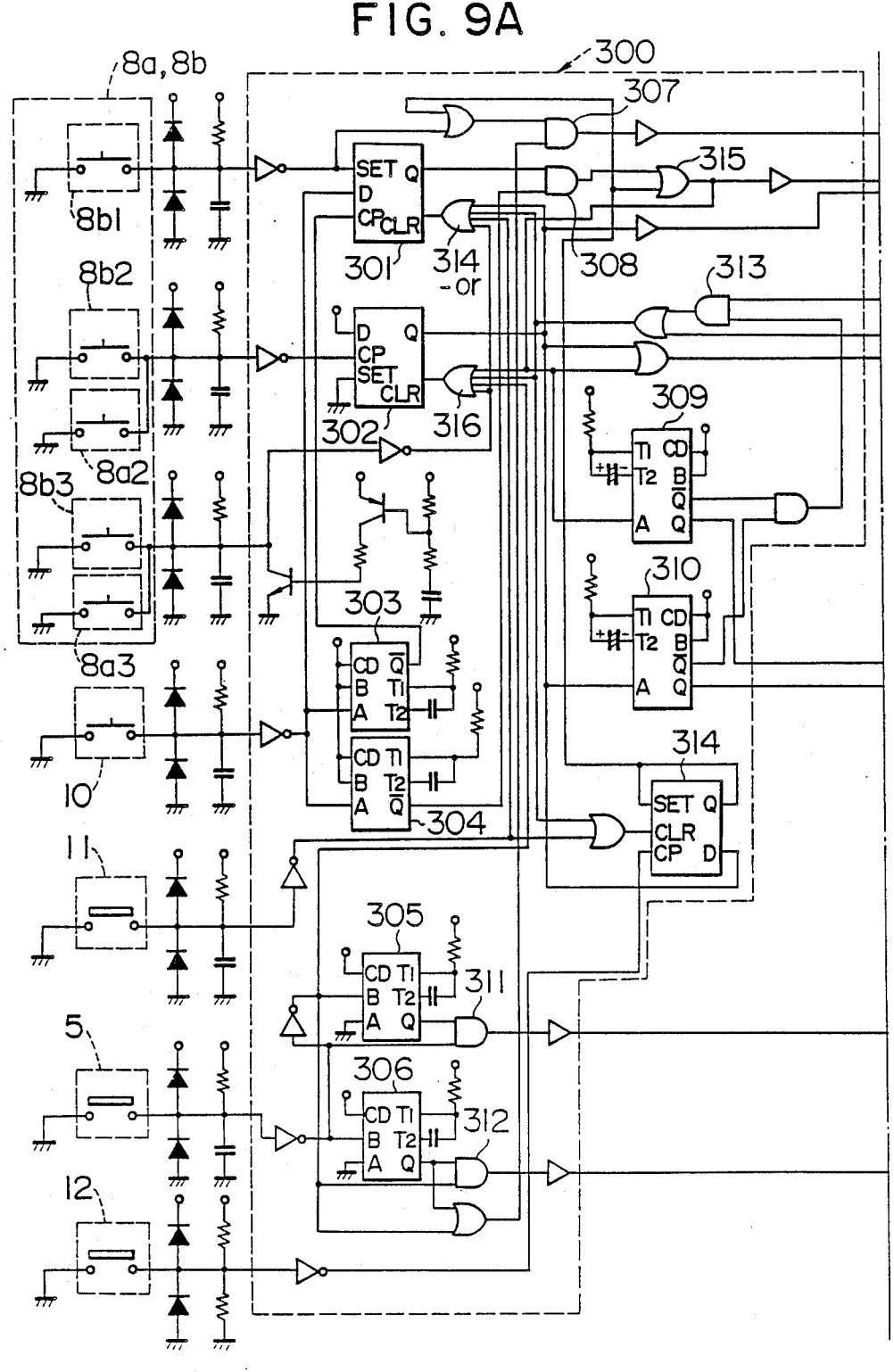
FIG. 9 (including FIGS. 9A-9C) illustrates detailed electric circuits of the electric arrangement shown in FIG. 8.
Figure 9B:
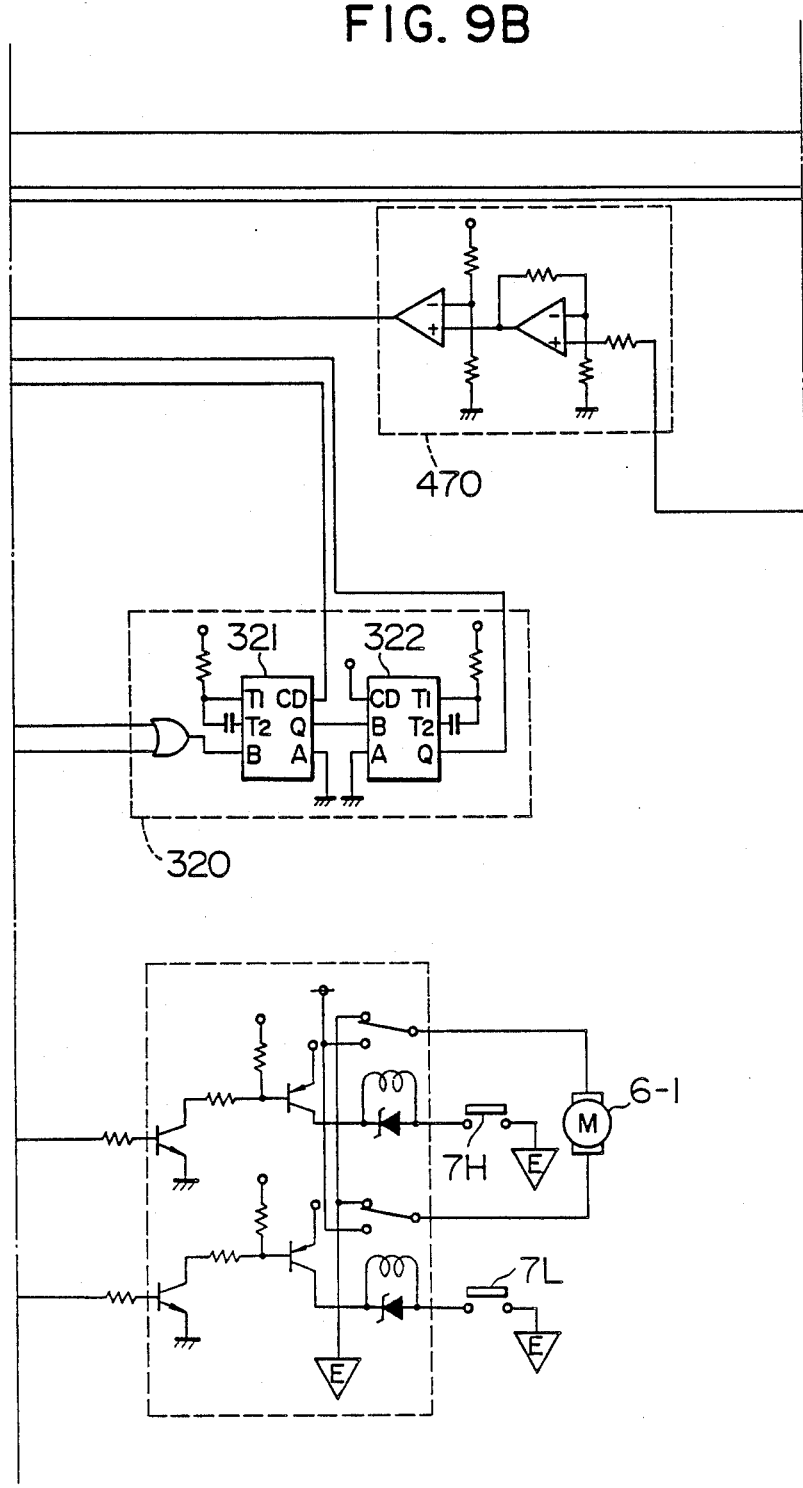
Figure 9C:
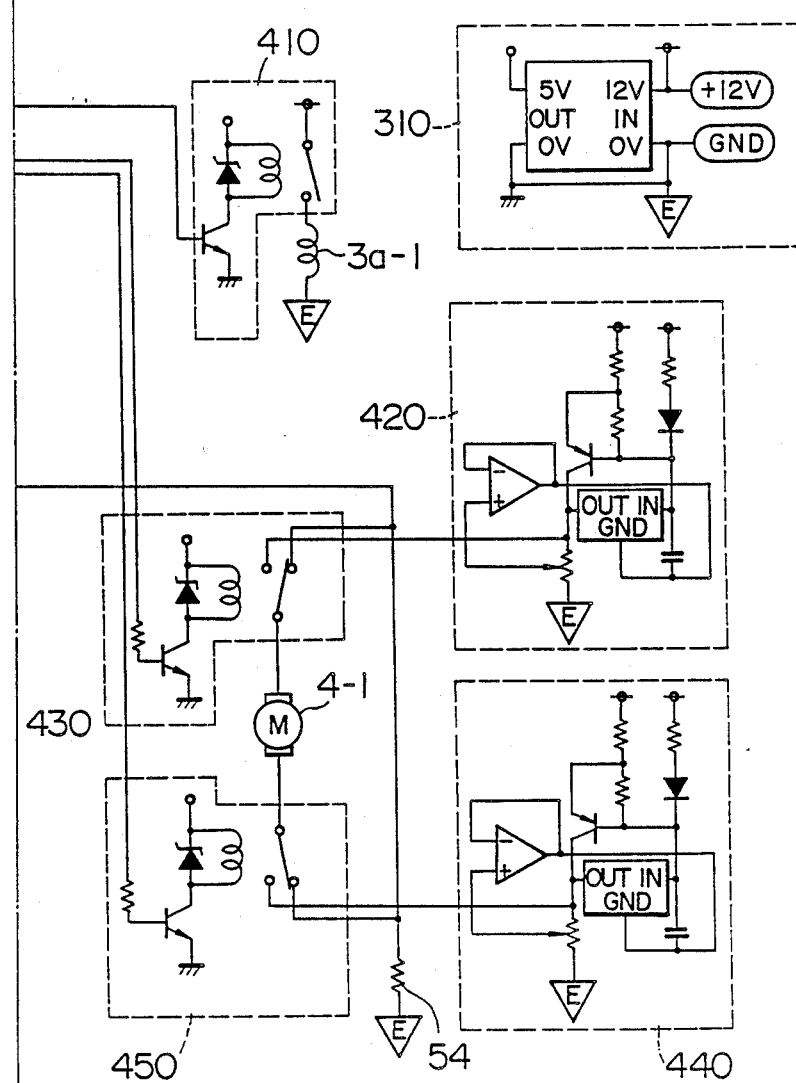
Figure 9:
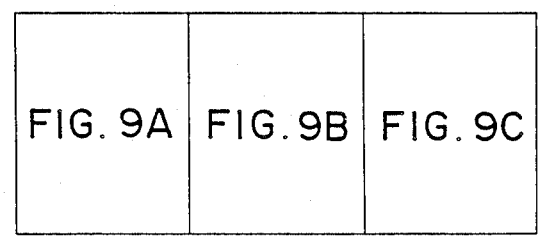

Electrical components of the controlling unit 9 and other components associated therewith are arranged in the manner illustrated in a block diagram shown in FIG. 8, while detailed electrical circuits are shown in FIG. 9.

Referring to these figures, a controller 300 forms a main component of the controlling unit 9 and electrically connected to an electric power source 310. The controller 300 are responsive to signals from respective switches and sensors to generate signals for controlling the lid motor 4-1 shown in FIG. 4A, the luggage motor 6-1 shown in FIG. 2 and the unlocking solenoid 3a-1 shown in FIG. 2. The speeds of the lid-opening motion and lid-closing motion are controlled independently of the controller 9 by an opening-speed control 420 and a closing-speed control 440. These control 420 and 440 are adapted to pre-set the voltage of the electric supply to the lid motor 4-1 to control the speeds of the lid-opening and closing motions as well as to prevent the flow of an overcurrent when a short-circuit takes place in an electric supply circuit for the lid motor 4-1. The Electric supply circuit for the lid motor 4-1 includes a motor-opening driver 430 and a motor closing driver 450. These drivers 430 and 450 are operative to supply electric signals through 10 relays to the lid motor 4-1 to drive the same when motor-opening and motor-closing signals from the controller 300 are of "1" levels, respectively. An overload detector 470 is electrically connected across the motor drivers 430 and 450 and operative to judge a voltage drop at a resistor 54 shown in FIG. 9c and indirectly detect the level of the ampere through the variation in the voltage. The detector 470 then increases the voltage by an operational amplifier, compares the voltage by a comparator and feeds to the controller 300 a signal representing the result of the comparison. This signal is of a "0" level when the load is within a rated range and is of a "1" level when the load is higher than the rated range.

The controller 300 controls a solenoid driver 410 such that, when a solenoid lid-opener signal generated by the controller 300 is of "1" level, the solenoid driver 410 feeds an electric signal through a relay to the unlocking solenoid 3a-1 to drive the same to thereby unlock the lid 2.

A luggage motor driver 480 is controlled by the controller 300 such that, when raising and lowering signals generated by the controller are each of "1" level, the motor driver 480 actuates the luggage motor 6-1 through a relay until either the upper limit switch 7H (FIG. 2) or the lower limit switch 7L is opened. The speed of the lid driven by the luggage motor b-1 is set to be lower than the speed of the lid driven by the lid motor 4-1.

A motor operation time controller 320 generates a signal to the controller 300 so that, when the lid motor 4-1 does not operate due, for example, to breaking of a motor circuit or wires in the motor or when the clutch mechanism fails to operate, the lid motor 4-1 is positively deenergized after the lapse of a predetermined time period from the time when the motor driving signal is output. More specifically, when the level of a one shot signal output by the controller 300 simultaneously with the motor driving signal is changed from "1" to "0", a timer 321 shown in FIG. 9B operates to emit a signal of "1" level through a Q terminal thereof to a timer 322 for about ten seconds. The timer 322 is operated by a dropping signal of the timer 321 to emit a signal of "1" level to the controller 300 for about 0.1 second. This signal causes the controller 300 to generate a signal which is effective to positively stop the lid motor 4-1 shown in FIG. 4A.

The operation of the described embodiment of the invention will be described hereunder with reference to FIGS. 10–14.

Figure 10:
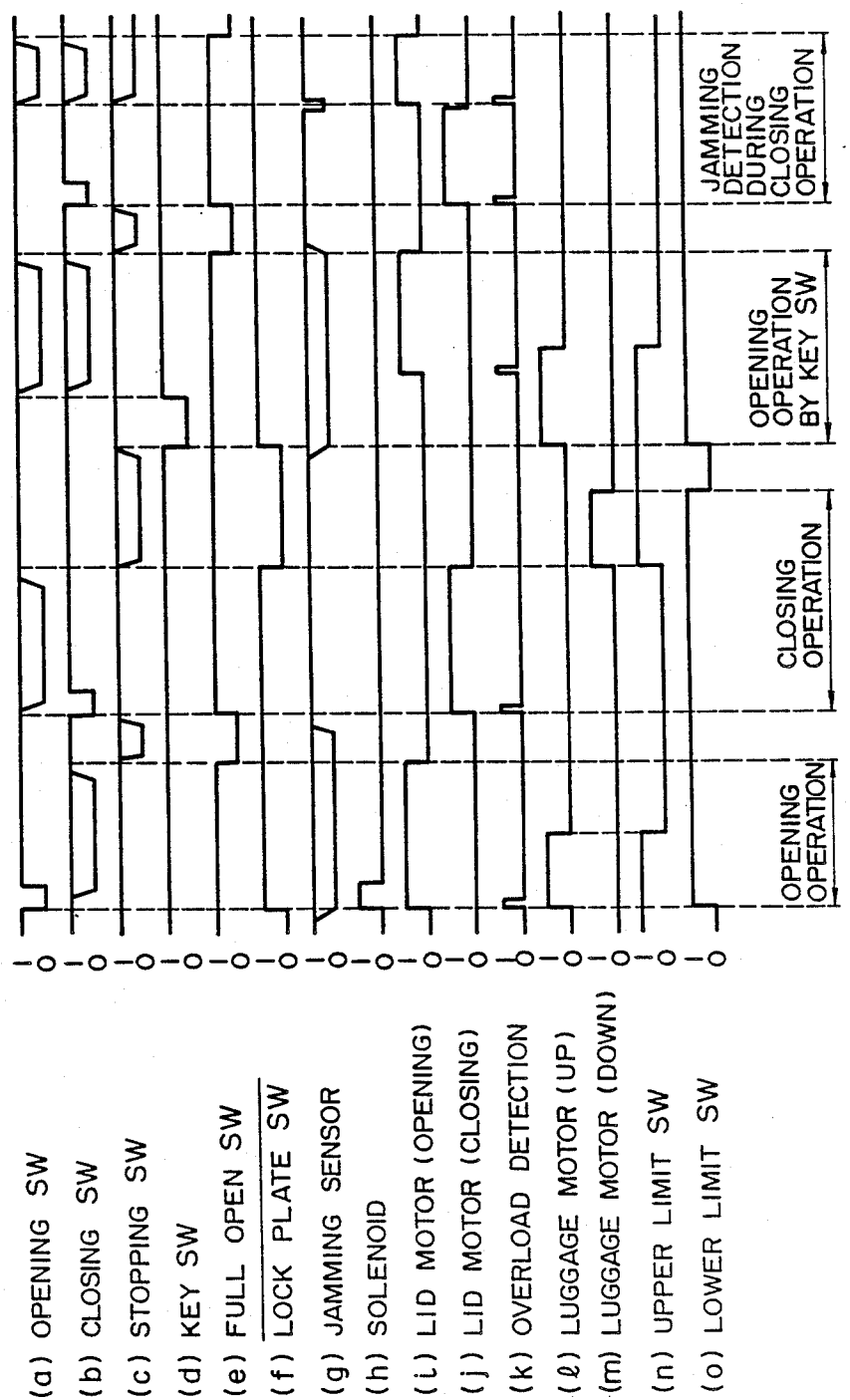

In the case where the lid 2 shown in FIG. 1 is to be opened, an opening switch 8b1 (FIG. 9A) of instruction switch means 8b shown in FIG. 7 is pushed to produce a dropping opening switch signal, as shown by line (a) in FIG. 10, so that the unlocking solenoid 3a-1 (FIG. 2) is operated, as shown by a line (h) in FIG. 10, to unlock the lid and, at the same time, the lid motor 4-1 (FIG. 4A) is energized to open the lid 2. In addition, the luggage motor 6-1 (FIG. 2) is operated to lift the striker 3b-1. At this moment, the striker is unlocked, so that the signal of the lock plate switch 5 becomes "0" level, as shown by line (f) in FIG. 10. Incidentally, even if a closing switch 8b2 shown in FIG. 9A is pushed during the lid opening operation, nothing occurs. Then, the upper limit switch 7H is opened, as shown by line (n) shown in FIG. 10, to stop the lifting operation of the luggage motor 6-1, as shown by line (l) in FIG. 10. Thereafter, the signal of the full open switch 11 (FIG. 1) becomes "0" level, as shown by line (e) in FIG. 10 to stop the lid motor 4-1, as shown by a line (i) in FIG. 10.

The above-described operation will be described in more detail with reference to FIG. 11. In a normal operation range, when a signal of an opening switch 8b1 shown in FIG. 9A drops from "1" to "0", as shown by line (a), the output signals from a Q terminal of a flip-flop (termed hereunder "FF") 301, an AND 307, an AND 308 and a Q terminal of a timer 309 rise from "0" to "1". Due to the changes of these signals, the AND 308 generates a lid-opening signal, while the AND 307 generates a solenoid-driving signal. As the solenoid 3a-1 shown in FIG. 2 is operated in a manner indicated by a line (n) in FIG. 11, the signal of the locking plate switch 5 becomes "1" level, so that the Q terminal 10 of the timer 305 shown FIG. 9A outputs a signal of "1" level for a predetermined time period, as shown by a line (k) in FIG. 11. An AND 311 conducts an AND operation of the signal from the timer 305 and the NOT of the signal from the lock plate switch 5 to generate a signal for the lifting operation of the luggage motor 6-1. When the lid motor 4-1 commences its lid-opening operation, a great rush current will flow, which is detected by the overload detector 470 which, thus, outputs an overload signal of "1" level, as shown by a line (d) in FIG. 11. The overload signal, however, is processed by an AND operation by an AND 313 together with an output from the timer 309, so that the overload immediately after the commencement of the operation of the lid motor 4-1 is neglected. The Q terminal of the timer 309 outputs a signal of "1" level for 0.5 second. This signal is fed into the motor operation time controller 320. Thereafter, the upper limit switch 7H shown in FIG. 2 is opened, and relays Ry-1 and Ry-2 of the luggage motor driver 480 shown in FIG. 9 are turned off so that the lifting operation of the luggage motor 6-1 is stopped, as shown by a line (o) in FIG. 11. Thereafter, the output from the Q terminal of the timer 305 drops simultaneously with the drop of the luggage motor lifting signal of the AND 311, so that the signal to the luggage motor 6-1 becomes "0" level. Thereafter, when the signal of the full open switch 11 shown in FIGS. 1 and 11 becomes "0" level, the NOT signal is fed into an OR 314—or which generates an output of "1" level, so that a CLR terminal of an FF 301 becomes to be of "1" level, as shown by a line (i) in FIG. 11. This causes the Q terminal of the FF 301 to be of "0" level. The output of the AND 308 also becomes "0" level. Thus, the lid motor 4-1 is stopped.

Figure 11:
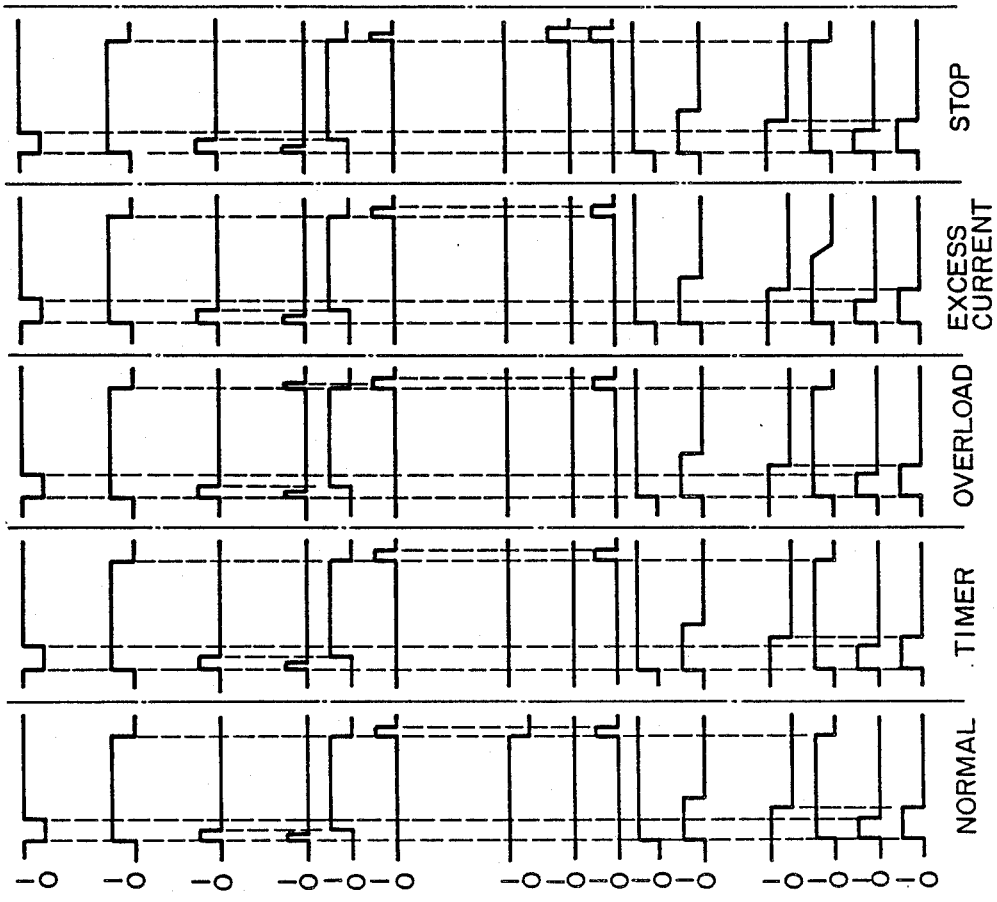

The operation range "TIMER" shown in FIG. 11 indicates an operating condition in which the lid is not fully open due to a failure of operation of some components of the system, such as the clutch mechanism, during the time period in which the timer 321 is operated. In this case, the outputs of the Q terminals of timers 321 and 322 are inverted, the output of the Q terminal of FF 301 becomes "0" level and the lid motor 4-1 is stopped before the signal from the full open switch 11 becomes "0" level.

The operation range "OVERLOAD" shown in FIG. 11 indicates an operation condition in which a signal is generated by the overload detector 470, so that the output of the CLR terminal of the FF 301 becomes "1" level and the output of the Q terminal of the FF 301 becomes "0" level with a resultant stoppage of the lid motor 4-1. In other words, the overload detector 470 operates also in a case where a hand or the like of a person is caught in the lid to stop the electrical supply to the lid motor to thereby allow the lid to be manually operated to remove the hand from the lid. Thus, the overload detector 470 constitutes a means for interrupting the electrical supply.

The operation range "EXCESS CURRENT" shown in FIG. 11 is an operating condition in which an excessive current flows due to a short-circuit caused in the motor circuit. In this case, the overcurrent-protection function of the speed controllers 420 and 440 stops the lid motor 4-1.

The operation range "STOP" shown in FIG. 11 is an operating condition in which a stop signal is generated by the stop switch 8b3 during the lid- opening operation of the lid motor 4-1. In this case, the output of the Q terminal of the FF 301 becomes "0" level to stop the lid motor 4-1 irrespective of the lidopening operation of the motor.

Then, a lid-closing operation will be described hereunder. When the lid-closing switches 8a2 and 8b2 of the instruction switch means 8a and 8b disposed in the passenger compartment or in the luggage compartment are pushed, the closing switch signal becomes "0" level, as shown by a line (b) in FIG. 10, so that the lid motor 4-1 is energized to commence closing of the lid 2. Thereafter, the striker 3b-1 is engaged with a part of the lid 2, so that the signal from the locking plate switch 5 becomes "1" level, as shown by a line (f) in FIG. 10, with a result that the lid motor 4-1 is energized to commence closing of the lid 2. Thereafter, the striker 3b-1 is engaged with a part of the lid 2, so that the signal from the locking plate switch 5 becomes "1" level, as shown by a line (f) in FIG. 10, with a result that the lid motor 4-1 is stopped, as will be seen from a line (j) in FIG. 10, and the luggage motor 6-1 commences its operation to begin a downward movement of a part of the locking mechanism, as shown by a line (m) in FIG. 10. The operation of the luggage motor 6-1 lasts until the output of the lower limit switch 7L becomes "0" level, as will be seen from a line (o) in FIG. 10, to fully close the lid 2. Incidentally, any attempt to press the opening switch during the lid-closing operation is not effective to open the lid.

The lid-closing operation will be described in more detail with reference to FIG. 12. In a normal operation range, closing switches 8a2 and 8b2 are pushed to generate a closing signal of "0" level, as shown by a line (a) in FIG. 12, with a result that signals from the CP terminal of an FF 302, from the Q terminal thereof and from the Q terminal of the timer 310 rise to "1" level, respectively. Due to the changes of the levels of these signals, a signal is produced which causes the lid motor 4-1 to commence a lid-closing operation. When the lid motor 4-1 begins to operate, there occurs a flow of a great deal of rush current, which is detected by an overload detector 470. The latter, therefore, generates an overload signal of "1" level. This overload signal, which is produced just after the commencement of the lid-closing operation of the lid motor 4-1, is neglected and, thus, does not cause anything because the overload signal and a $\bar{Q}$ signal of the timer 310 are processed by an AND 313. The Q terminal of the timer 310 outputs a signal of "1" level for about 0.5 second. This signal is fed to a motor operation time controller 320. In a short time from the commencement of the lid motor operation in the lid closing direction, the striker 3b shown in FIG. 2 is locked, so that the signal of the locking plate switch 5 becomes "0" level, the signals of the Q terminal of a timer 306, of the CLR terminal of the FF 302 and of the AND 312 become "0" level and the signal of the Q terminal of the FF 302 becomes "0" level, with a result that the lid motor 4-1 is stopped. The signal of the AND 312 is fed to the luggage motor driver 480, so that the luggage motor 6-1 commences its lid-lowering operation to move the lid into sealing engagement with the body of the automobile.

Figure 12:
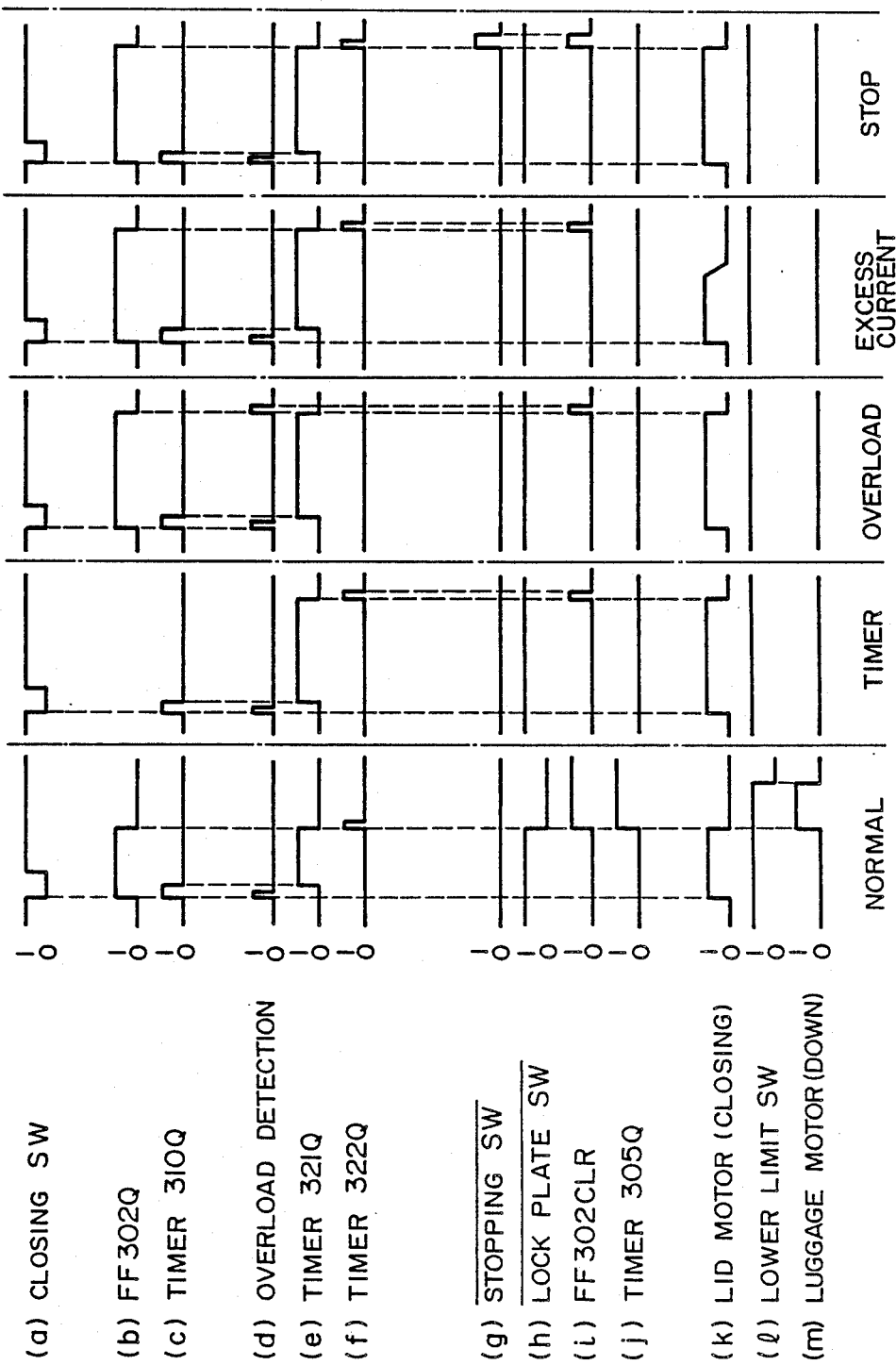

The operations in respective ranges of "TIMER", "OVERLOAD", "EXCESS CURRENT" and "STOP" shown in FIG. 12 are similar to the operations in the corresponding ranges of the lid-opening operation shown in FIG. 11.

Then, an operation to open the lid 2 by means of a key switch 10 will be described hereunder. When the key switch 10 is pushed, the signal of the key switch becomes "0" level, as shown by a line (d) in FIG. 10. After the key switch 10 has been kept pushed for a predetermined time period, the controller 300 judges the key switch signal as a lid-opening signal to energize the lid motor 4-1, so that the lid 2 commences its opening motion. Simultaneously, the locking plate signal becomes "0" level, so that the luggage motor 6-1 is operated to lift the striker shown in FIG. 2. In a short time, the signal of the upper limit switch 7H becomes "0" level, so that the luggage motor 6-1 is stopped. In a short time thereafter, the signal of the full open switch 11 becomes "0" level, with a resultant stoppage of the lid motor 4-1.

Figure 13:
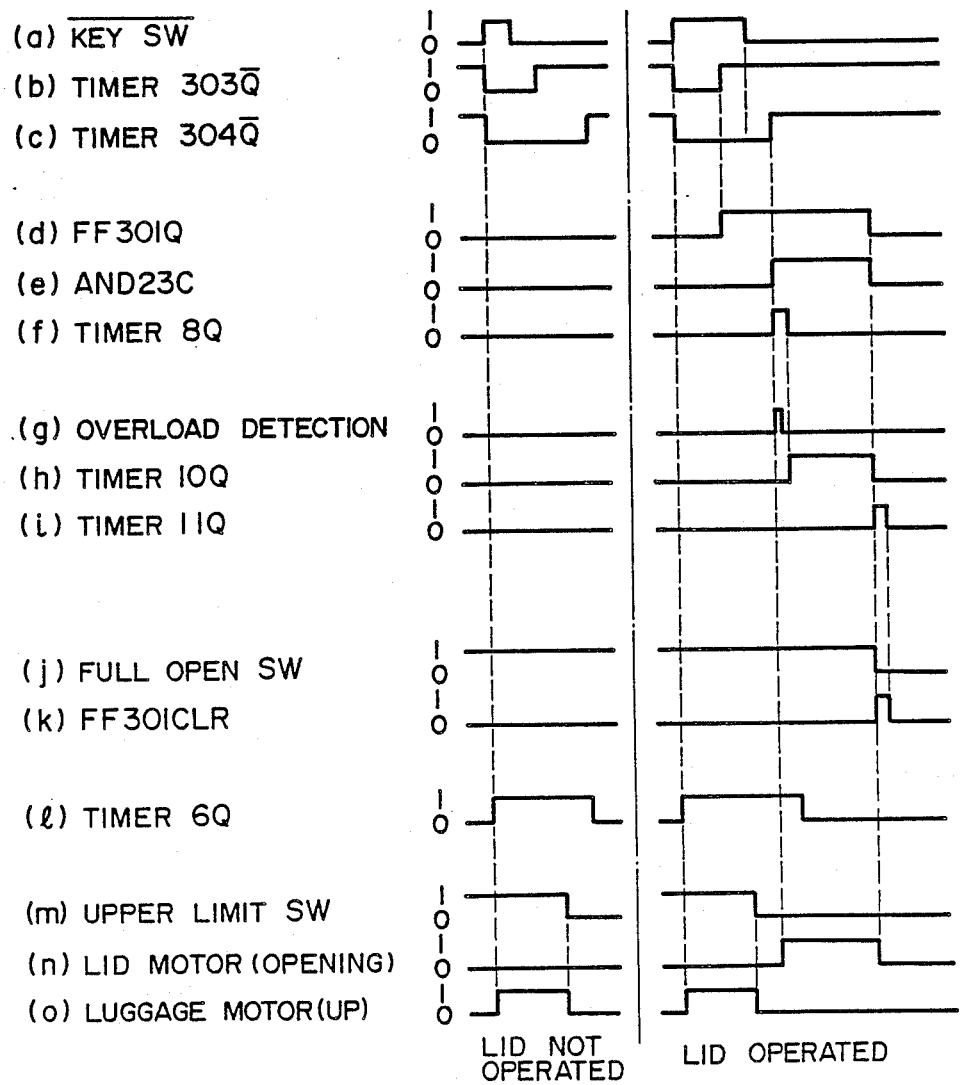

The operation described above will be described in more detail hereunder with reference to FIG. 13. The operation time of the key switch 10 determines whether or not the lid is operated or nor. If the signal of the key switch 10 becomes "0" level, the timers 303 and 304 begin to operate. The timer 303 is of one second operation type. When the signal of the $\bar{Q}$ terminal of the timer 303 is "0" level, namely, when the key switch 10 is kept turned on, the Q terminal of the FF 301 outputs a signal of "1" level as a signal for opening the lid 2. The $\bar{Q}$ terminal of the timer 304 outputs a signal of "0" level for five seconds. This signal and the signal of the Q terminal of the FF 301 are processed by the AND 308 to provide a time lag for allowing a key of the key switch 10 to be taken out. When the $\bar{Q}$ terminal of the timer 304 has become "1" level, the AND 308 outputs a signal for energizing the lid motor 4-1.

Then, the description will be directed to a case where something is caught or jammed in the lid 2. The jamming takes place only during the lid-closing operation.

When a jamming occurs, the signal of the jamming sensor becomes "0" level, as shown by a line (g) in FIG. 10, so that the lid motor 4-1 is operated in the reversed or backward direction to commence a lid-opening operation. This lid-opening operation will lasts until the signal of the full open switch 11 becomes "0" level. During this lid-opening operation, any attempt to push any one of the lid-opening switch 8b1, the lid-closing switches 8b2 and 8a2 and the stop switches 8b3 and 8a3 does not cause any operation.

The above-described operation will be described in more detail with reference to FIG. 14. During the lid-closing operation, the closing signal keeps the D terminal of the FF 314 at "1" level. In this state, if a jamming is detected, the jamming signal will drop with a resultant rise of the signals of the CP terminal of the FF 314 and of the Q terminal of the FF 314. The signal of the Q terminal of the FF 314 is fed to an OR 315 which in turn outputs a signal of "1" level as a lid-opening signal fed to the lid motor driver 430. At the same time, the OR 315 generates a signal of "1" level to an OR 316, with a result that the CLR terminal of the FF 302 becomes "1" level. This causes the Q terminal of the FF 302 to become "1", so that the lid motor 4-1 is immediately reversed to commence a lidopening operation.

As described in detail above, the device according to the present invention carries out a lid-opening operation, a lid-closing operation, a lid-opening operation by means a key switch 10, and a jamming-detection operation.

Then, a modification to the clutch mechanism described above with reference to FIG. 4 will be described with reference to FIGS. 15A and 15B. It will be remembered that, in the embodiment shown in FIG. 4, the inertia disc 27 is made from a heavy material to exhibit an inertia force relative to the worm wheel 23 and the housing 24. In the modification shown in FIGS. 15A and 15B, however, an "O" ring 31 is disposed around the outer peripheral surface of the inertia disc 27 so that the rotation of the disc 27 is resisted by a friction, rather than an inertia force, produced between the "O" ring 31 and the inner peripheral surface of the second casing 30.

Figure 16A:
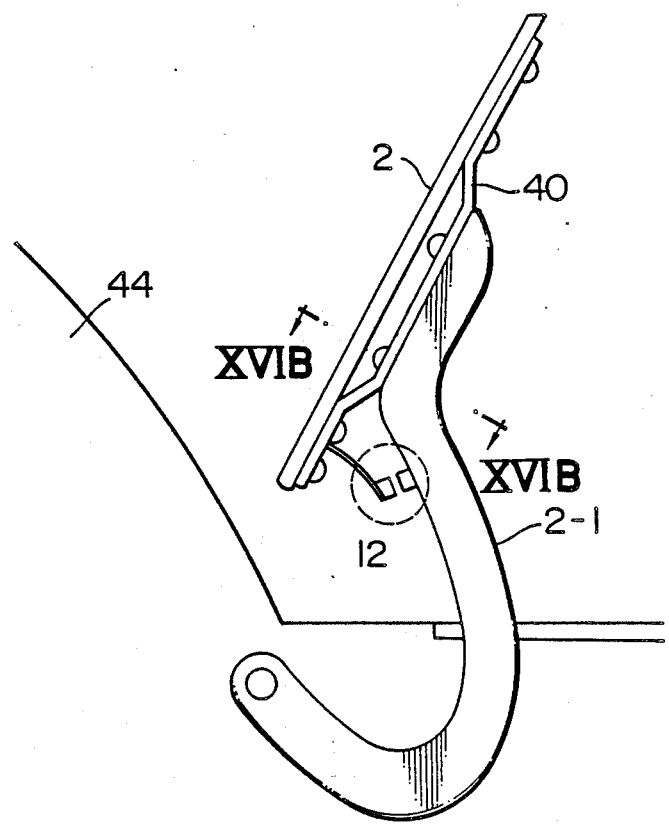
FIGS. 16A and 16B and 17A and 17B are respectively similar to FIGS. 6A and 6B but illustrate a modification to the embodiment shown therein.
Figure 16B:
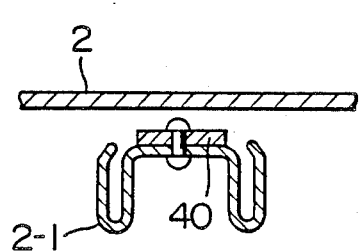

FIGS. 16A and 16B show a modification to the jamming sensor 12 and the flexible member shown in FIGS. 6A and 6B. In the modification, the flexible member 40 is connected at the opposite ends to the lid 2 to improve the stability of the lid.

Figure 17A:
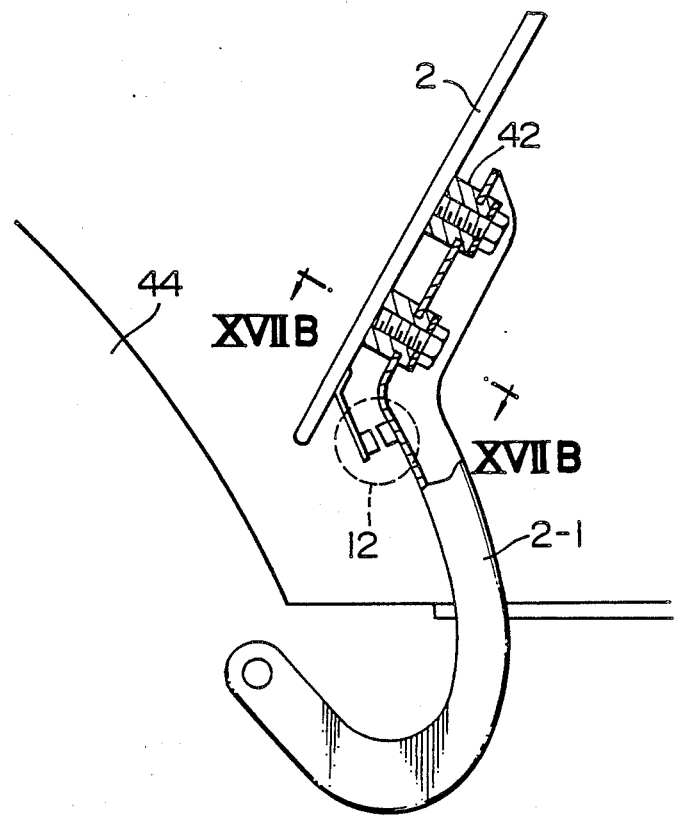
Figure 17B:
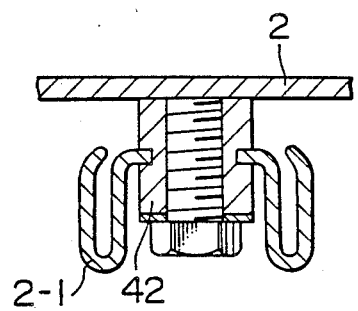

FIGS. 17A and 17B show another modification to the jamming sensor 12 and the flexible member. In this modification, the flexible member 40 is replaced by rubber mounts 42 which improve the response of the jamming detection by the jamming sensor 12.

What is claimed is:

1. A manually assistable electric driving device of the type in which a driven member can be electrically driven in forward and backward directions and the movement of the driven member being driven electrically can be manually assisted to increase the speed of the movement, the device comprising:
   a reversible electric motor;
   a first rotor adapted to be driven by said electric motor and having an axial through-hole, said first rotor having at least one arcuate recess formed in the inner peripheral surface of said axial through-hole and having slopes at the opposite ends of said recess;

a second rotor having a cylindrical outer peripheral surface and rotatably disposed in said axial through-hole in said first rotor;

a bearing means disposed in said arcuate recess in said first rotor and adapted to be brought into engagement with said slopes of said arcuate recess and with said outer peripheral surface of said second rotor;

bearing retainer for supporting said bearing means such that said bearing means is movable radially and circumferentially of said first rotor;

resilient means operative to store an elastic energy when said first rotor is rotated by said electric motor relative to said second rotor so that one of said slopes of said first rotor is drivingly coupled by said bearing means to said outer peripheral surface of said second rotor, the thus stored elastic energy driving said bearing means to a substantially central portion of said arcuate recess when said electric motor is stopped whereby said second rotor is freely rotatable independently of said first rotor; and said driven member being drivingly connected to said second rotor.

2. A manually assistable electric driving device according to claim 1, wherein said driven member is in the form of a door to be opened and closed by said motor.

3. A manually assistable electric driving device according to claim 2, wherein said door is a lid of a luggage compartment of an automobile.

4. A manually assistable electric driving device according to claim 1, wherein said first rotor is provided with a plurality of the arcuate recesses formed in the inner peripheral surface of said axial throughhole and said bearing means comprises rollers disposed in said arcuate recesses, respectively.

5. A manually assistable electric driving device according to claim 4, further including a third rotor surrounding said first rotor and having an arcuate recess formed therein and wherein said bearing retainer comprises a plurality of arcuate projections integrally formed on said third rotor, said first rotor has a projection extending into said arcuate recess in said third rotor and said resilient means comprises a pair of spring members disposed in said arcuate recess in said third rotor and on the opposite sides of said projection on said first rotor.

6. A manually assistable electric driving device according to claim 1, further including means for automatically interrupting the electrical supply to said motor when a movement of said driven member by said motor is interfered with a force stronger than a predetermined magnitude.

* * * * *